(12) United States Patent
Matsumoto et al.

(10) Patent No.: US 12,255,027 B2
(45) Date of Patent: Mar. 18, 2025

(54) ELECTROLYTIC CAPACITOR

(71) Applicant: Panasonic Intellectual Property Management Co., Ltd., Osaka (JP)

(72) Inventors: Takayuki Matsumoto, Saga (JP); Nobuhiro Tanigaki, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 107 days.

(21) Appl. No.: 18/254,152

(22) PCT Filed: Dec. 20, 2021

(86) PCT No.: PCT/JP2021/047002
§ 371 (c)(1),
(2) Date: May 23, 2023

(87) PCT Pub. No.: WO2022/138556
PCT Pub. Date: Jun. 30, 2022

(65) Prior Publication Data
US 2024/0006128 A1   Jan. 4, 2024

(30) Foreign Application Priority Data
Dec. 25, 2020 (JP) .................... 2020-217858

(51) Int. Cl.
*H01G 9/012* (2006.01)
*H01G 9/10* (2006.01)
*H01G 9/15* (2006.01)

(52) U.S. Cl.
CPC ............ *H01G 9/012* (2013.01); *H01G 9/10* (2013.01); *H01G 9/15* (2013.01)

(58) Field of Classification Search
CPC ...................................................... H01G 9/012
See application file for complete search history.

(56) References Cited

U.S. PATENT DOCUMENTS

| 2003/0151884 A1 | 8/2003 | Matsumoto |
| 2007/0081301 A1* | 4/2007 | Tanaka ............... H01G 2/065 361/540 |

(Continued)

FOREIGN PATENT DOCUMENTS

| JP | 2003-068576 | 3/2003 | |
| JP | 2009-141208 | 6/2009 | |
| WO | WO-2014038203 A1 * | 3/2014 | ............. H01G 9/012 |

OTHER PUBLICATIONS

International Search Report of PCT application No. PCT/JP2021/047002 dated Mar. 8, 2022.

*Primary Examiner* — Eric W Thomas
(74) *Attorney, Agent, or Firm* — Rimon P.C.

(57) ABSTRACT

An electrolytic capacitor includes a capacitor element having bottom surface and upper surface and including an anode lead, a cathode lead terminal, and outer packaging resin. The cathode lead terminal includes a cathode terminal having an exposed surface exposed from bottom surface, and two cathode anchor portions each extending from the cathode terminal to be embedded in the outer packaging resin. The cathode terminal has two end sides each being along a longitudinal direction of the anode lead. Each of the two cathode anchor portions includes a cathode upright portion rising from corresponding one of two end sides of the cathode terminal toward upper surface, a first extension portion extending from the cathode upright portion, and a second extension portion extending from the first extension portion.

9 Claims, 6 Drawing Sheets

(56) References Cited

U.S. PATENT DOCUMENTS

2009/0128998 A1* 5/2009 Matsuoka ............. H01G 9/012
361/532
2009/0147448 A1 6/2009 Matsuoka et al.
2016/0093447 A1* 3/2016 Kato ....................... H01G 9/10
361/540

* cited by examiner

ELECTROLYTIC CAPACITOR

TECHNICAL FIELD

The present disclosure relates to an electrolytic capacitor.

BACKGROUND

Electrolytic capacitors are mounted on various electronic devices. An electrolytic capacitor usually includes an anode lead terminal and a cathode lead terminal each electrically connected to a capacitor element, and outer packaging resin covering the capacitor element.

Unexamined Japanese Patent Publication No. 2003-068576 and Unexamined Japanese Patent Publication No. 2009-141208 disclose a cathode lead terminal that facilitates positioning of a capacitor element. Specifically, Unexamined Japanese Patent Publication No. 2003-068576 discloses that both sides of a cathode lead terminal are bent upward to form a fitting portion, and a capacitor element is disposed in the fitting portion. Unexamined Japanese Patent Publication No. 2009-141208 discloses that a cathode lead frame is provided with a pair of side surfaces facing each other, and a capacitor element is placed between a pair of the side surfaces.

SUMMARY

A lead terminal includes a terminal having an exposed surface exposed from a bottom surface of an electrolytic capacitor, and the exposed surface can be a joint surface with a printed board or the like. However, the terminal may be away from the bottom surface of the electrolytic capacitor (the exposed surface of the terminal rises from the bottom surface of the electrolytic capacitor) due to expansion or the like of the lead terminal during reflow treatment. Thus, improvement in terminal strength is required.

One aspect of the present disclosure relates to an electrolytic capacitor having a bottom surface and an upper surface opposite to the bottom surface. The electrolytic capacitor includes a capacitor element including an anode lead, an anode lead terminal and a cathode lead terminal each electrically connected to the capacitor element, and outer packaging resin disposed around the capacitor element. The cathode lead terminal includes a cathode terminal having an exposed surface exposed from the bottom surface, and two cathode anchor portions each extending from the cathode terminal to be embedded in the outer packaging resin. The cathode terminal has two end sides each being along a longitudinal direction of the anode lead. Each of the two cathode anchor portions includes a cathode upright portion, a first extension portion, and a second extension portion. The cathode upright portion rises from a corresponding one of the two end sides of the cathode terminal toward the upper surface. The first extension portion extends from the cathode upright portion. The second extension portion extends from the first extension portion. The first extension portion is bent from an upper end of the cathode upright portion. The second extension portion rises toward the upper surface. The first extension portion of one of the two cathode anchor portions and the first extension portion of another one of the two cathode anchor portions extend away from each other. The second extension portion of the one of the two cathode anchor portions and the second extension portion of the another one of the two cathode anchor portions are provided so as to sandwich the capacitor element in a direction perpendicular to the longitudinal direction of the anode lead.

According to the present disclosure, in an electrolytic capacitor, terminal strength can be increased while position deviation of a capacitor element is suppressed.

DESCRIPTION OF EMBODIMENT

Hereinafter, an exemplary embodiment of the present disclosure will be described with reference to examples, but the present disclosure is not limited to the examples described below. In description below, specific numerical values and materials may be provided as examples, but other numerical values and materials may be applied as long as the effect of the present disclosure can be obtained. Note that constituent elements of known electrolytic capacitors may be applied to constituent elements other than parts that are characteristics of the present disclosure.

(Electrolytic Capacitor)

An electrolytic capacitor of the present disclosure includes a bottom surface, and an upper surface opposite to the bottom surface. Hereinafter, the bottom surface and the upper surface may be referred to as "bottom surface (B)" and "upper surface (T)". An electrolytic capacitor of the present disclosure includes a capacitor element including an anode lead, an anode lead terminal and a cathode lead terminal each electrically connected to the capacitor element, and outer packaging resin disposed around the capacitor element.

The cathode lead terminal includes a cathode terminal having an exposed surface exposed from bottom surface (B), and two cathode anchor portions each extending from the cathode terminal to be embedded in outer packaging resin. Hereinafter, the lead terminal including the two anchor portions may be referred to as "lead terminal (L)". The cathode terminal includes two end sides each being along direction D1 in which an anode lead extends (a longitudinal direction of the anode lead). Each of two cathode anchor portions includes a cathode upright portion that rises from a corresponding one of the two end sides of the cathode terminal toward upper surface (T), and a first extension portion that bends to extend from an upper end of the cathode upright portion.

As described above, the cathode anchor portion (the cathode upright portion and the extension portion) is embedded in outer packaging resin. Furthermore, a metal sheet constituting lead terminal (L) is bent at two points of a boundary between the cathode terminal and the cathode upright portion and a boundary between the cathode upright portion and the first extension portion. According to this configuration, a direction in which the cathode upright portion extends is different from a direction in which the first extension portion extends.

Furthermore, each of the two anchor portions is bent in different directions (reverse rotation directions) at a boundary between the cathode terminal and the cathode upright portion and a boundary between the cathode upright portion and the first extension portion. Here, bent in different directions means that a metal sheet constituting lead terminal (L) is bent such that one surface (surface on the side of upper surface (T)) of the metal sheet is a valley at a boundary between the cathode terminal and the cathode upright portion, and is bent such that the one surface is a mountain at a boundary between the cathode upright portion and the first extension portion. More specifically, the first extension portions of the two cathode anchor portions are bent from an upper end of the cathode upright portion and extend away from each other. That is, the first extension portions of the two cathode anchor portions are bent from an upper end of the cathode upright portion and extend away from each other in direction D2 perpendicular to direction D1 in which the anode lead extends.

The two cathode anchor portions (the cathode upright portion and the first extension portion) provide a high anchor effect and increase terminal strength. In particular, since the entire surface of the cathode upright portion is covered with outer packaging resin, separation of the cathode terminal from the outer packaging resin (the bottom surface of the electrolytic capacitor) is suppressed.

On a surface of the cathode terminal, a region opposite to an exposed surface of the cathode terminal is preferably in contact with outer packaging resin. In this case, the outer packaging resin enters between the capacitor element and the cathode terminal, the capacitor element is more stably fixed with the outer packaging resin, and the cathode terminal is further prevented from being separated from the outer packaging resin, so that the anchor effect is increased.

Each of the two cathode anchor portions further includes a second extension portion extending from the first extension portion. Hereinafter, the first extension portion and the second extension portion may be collectively referred to as a cathode extension portion. The second extension portions of the two cathode anchor portions each rise toward upper surface (B). The second extension portion is bent from an end on the outer side of the first extension portion (an end on the opposite side to the cathode upright portion) and extends toward upper surface (B). A direction in which the first extension portion extends is different from a direction in which the second extension portion extends. Hence, by further providing the second extension portion together with the first extension portion, the anchor effect by the cathode anchor portion is further enhanced.

The second extension portions of the two cathode anchor portions each rise toward upper surface (B), and are provided so as to sandwich the capacitor element in direction D2 perpendicular to direction D1 in which the anode lead extends. The second extension portion prevents position deviation of the capacitor element. As described above, the two cathode anchor portions can play a role of positioning the capacitor element and a role of preventing separation of the cathode terminal from the outer packaging resin.

Size of the cathode anchor portion is not particularly limited as long as the anchor effect can be obtained. The two cathode anchor portions included in one lead terminal (L) are usually symmetrical with respect to a plane perpendicular to bottom surface (B) and passing through a central axis of the anode lead, but do not need to be symmetrical.

In the electrolytic capacitor of the present disclosure, the cathode lead terminal may include a cathode connection part extending from the cathode terminal and embedded in the outer packaging resin. The cathode connection part is electrically connected to a cathode part of the capacitor element. In this case, the cathode connection part may be in contact with a bottom surface of the capacitor element with an electrically conductive adhesive layer interposed between them, and the second extension portion may be in contact with a side surface of the capacitor element with an electrically conductive adhesive layer interposed between them. In this case, a contact area between the capacitor element and the cathode lead terminal increases, which is advantageous in reducing equivalent series resistance (ESR), and the like. From the viewpoint of design such as simplification of a manufacturing process and tolerance, the second extension portion may be in direct contact with a side surface of the capacitor element without provision of the electrically conductive adhesive layer, and the second extension portion may be in contact with a side surface of the capacitor element with the outer packaging resin interposed between them.

In the electrolytic capacitor of the present disclosure, an entire surface of the cathode extension portion (in a case where the second extension portion is in contact with a side surface of the capacitor element with the electrically conductive adhesive layer interposed between them, a region in contact with the electrically conductive adhesive layer is excluded) is preferably in contact with the outer packaging resin. From another point of view, in the electrolytic capacitor of the present disclosure, the anchor portion is preferably not in contact with the capacitor element. In this case, a high anchor effect is easily obtained for the cathode lead terminal.

In the electrolytic capacitor of the present disclosure, the anode lead terminal may include an anode terminal having an exposed surface exposed from bottom surface (B). Preferably, the anode lead terminal includes an anode connection part extending from the anode terminal and embedded in the outer packaging resin, and the anode connection part is electrically connected to the anode lead. The anode connection part preferably rises from the anode terminal toward an upper surface, and has a groove for receiving a tip of the anode lead at its upper end. In this case, the capacitor element can be positioned by using the second extension portions of the two cathode anchor portions and the groove of the anode connection part. That is, the capacitor element can be positioned at one point on the tip of the anode lead and two points on both side surfaces (both side surfaces perpendicular to bottom surface (B) and sandwiched between directions D2 perpendicular to direction D1 in which the anode lead extends) of the capacitor element. Both side surfaces of the capacitor element are sandwiched between the two second extension portions in a region (above the cathode terminal) of an end on the cathode anchor portion side opposite to the tip of the anode lead, so that the above-described positioning by the three points is effectively performed. By the above, the positioning accuracy of the capacitor element is significantly enhanced, and an effect of preventing position deviation of the capacitor element is remarkably obtained.

In a case of providing positioning side walls (side walls rising from both sides of the cathode connection part) of the capacitor element on both sides of cathode connection part to be described later without providing the cathode anchor portion, an anchor effect like that of the cathode anchor portion cannot be obtained, and separation of the cathode terminal from the outer packaging resin cannot be prevented.

The second extension portion is located farther from a tip of the anode lead than the side wall, and the capacitor element is more effectively positioned by the three points.

In the electrolytic capacitor of the present disclosure, the anode lead terminal may include two anode anchor portions. That is, the anode lead terminal may include an anode terminal having an exposed surface exposed from bottom surface (B), or may include two anode anchor portions each extending from the anode terminal to be embedded in the outer packaging resin. The anode terminal may have two end sides each being along a direction in which the anode lead extends, and each of the two anode anchor portions may include an anode upright portion rising from an end side of the anode terminal toward upper surface (T) and an anode extension portion bent and extending from an upper end of the anode uptight portion. A high anchor effect is obtained by the anode anchor portion, and separation of the anode terminal from the outer packaging resin is prevented.

The two anchor portions may be bent in different directions (reverse rotation directions) at a boundary between the anode terminal and the anode upright portion and a boundary between the anode upright portion and the anode extension portion. Here, bent in different directions means that a metal sheet constituting the anode lead terminal is bent such that one surface (surface on the side of upper surface (T)) of the metal sheet is a valley at a boundary between the anode terminal and the anode upright portion, and is bent such that the one surface is a mountain at a boundary between the anode upright portion and the anode extension portion. More specifically, the anode extension portions of the two anode anchor portions are bent from an upper end of the anode upright portion and extend away from each other. That is, the anode extension portions of the two anode anchor portions may be bent from an upper end of the anode upright portion and extend away from each other with respect to a direction perpendicular to a direction in which the anode lead extends. The anchor portion having this configuration is easily formed. Further, in a case where the anchor portion having this configuration is used, it is easy to perform filling with a material (mold resin or the like) of the outer packaging resin. Note that the two anode anchor portions may be bent in the same direction (the same rotation direction) at a boundary between the anode terminal and the anode upright portion and a boundary between the anode upright portion and the anode extension portion.

In the electrolytic capacitor of the present disclosure, the entire surface of the anode extension portion is preferably in contact with the outer packaging resin. In this case, a high anchor effect is easily obtained for the anode lead terminal. Size of the anode anchor portion is not particularly limited as long as the anchor effect can be obtained. The two anode anchor portions included in one anode lead terminal are usually symmetrical with respect to a plane perpendicular to bottom surface (B) and passing through a central axis of the anode lead, but do not need to be symmetrical.

Hereinafter, an example of constituent elements of the electrolytic capacitor of the present disclosure will be described.

(Anode Lead Terminal)

The anode lead terminal may be formed by processing one metal sheet by a known metal processing method, A material of the anode lead terminal may be any material that can be used as the material of the anode lead terminal of the electrolytic capacitor. For example, a material of a known anode lead terminal used for the electrolytic capacitor may be used. The anode lead terminal may be formed by processing a metal sheet (including a metal plate and a metal foil) made from metal (copper, copper alloy, and the like). A surface of the metal sheet may be subjected to plating such as nickel plating or gold plating. A thickness of the metal sheet constituting the anode lead terminal may be in a range from 25 μm to 200 μm, inclusive (for example, in a range from 25 μm to 100 μm, inclusive).

As described above, the anode lead terminal may include the anode terminal exposed from bottom surface (B) and the anode connection part (hereinafter also referred to as wire connection part) rising from the anode terminal toward the upper surface (T). As described above, two anchor portions may extend from the anode terminal. The anode lead of the capacitor element is connected to the wire connection part. The wire connection part may include a wire reception part bent at its tip so as to be substantially parallel to bottom surface (B). The wire reception part may be bent toward a front surface of the capacitor element or may be bent in an opposite direction. Here, the front surface of the capacitor element is a surface facing an end surface of the capacitor element from which a wire protrudes. The wire reception part enables reliable and easy connection between the wire connection part and the anode lead.

(Cathode Lead Terminal)

The cathode lead terminal may be formed by processing one metal sheet by a known metal processing method, A material of the cathode lead terminal may be any material that can be used as a material of the cathode lead terminal of the electrolytic capacitor. For example, a known cathode lead terminal material used in an electrolytic capacitor may be used. The cathode lead terminal may be formed of the metal sheet exemplified as the material of the anode lead terminal.

(Capacitor Element)

The capacitor element is not particularly limited. As the capacitor element, a capacitor element used in a known solid electrolytic capacitor or a capacitor element having a similar configuration may be used. Note that the electrolytic capacitor of the present disclosure may include a plurality of the capacitor elements. In this case, anode parts of a plurality of capacitors are electrically connected to the anode lead terminal.

An example of the capacitor element includes an anode part and a cathode part. The anode part includes an anode body having a dielectric layer formed on its surface and an anode lead, and the cathode part includes an electrolyte layer and a cathode layer. The electrolyte layer is disposed between the dielectric layer formed on a surface of the anode body and the cathode layer. These constituent elements are not particularly limited, and constituent elements used for known solid electrolytic capacitors may be applied. Examples of these constituent elements will be described below, (Anode Body)

As the anode body, for example, a columnar (for example, rectangular parallelepiped) porous sintered body obtained by sintering particles to be a material may be used. Examples of the particles include particles of valve metal, particles of an alloy containing valve metal, and particles of a compound containing valve metal. One of these kinds of particles may be used alone, or two or more of these kinds may be used in mixture. As the valve metal, titanium (Ti), tantalum (Ta), niobium (Nb), or the like is used. Alternatively, the anode body may be formed by roughening a surface of a base material (such as a foil-like or plate-like base material) containing the valve metal by etching or the like.

The anode part may be produced by a method below. First, a part of an anode lead is embedded in metal powder as a material of an anode body, and the metal powder is compression-molded into a columnar shape (for example, a rectangular parallelepiped shape). After the above, the powder of the metal is sintered to form an anode body. In this way, the anode part including the anode body and the anode lead partially embedded in the anode body can be produced.

The dielectric layer formed on a surface of the anode body is not particularly limited, and may be formed by a known method. For example, the dielectric layer may be formed by anodizing a surface of the anode body by immersing the anode body in an anodizing solution. Alternatively, the dielectric layer may be formed by heating the anode body in an atmosphere containing oxygen to oxidize a surface of the anode body.

(Anode Lead)

The anode lead may be a wire (anode wire) made from metal. Examples of a material of the anode lead include the above-described valve metal, copper, aluminum, and an aluminum alloy. A part of the anode lead is embedded in the anode body, and a remaining part protrudes from the anode body. Note that the anode lead is usually rod-like, but may be plate-like.

(Electrolyte Layer)

The electrolyte layer is not particularly limited, and an electrolyte layer used in a known solid electrolytic capacitor may be applied. Note that, in the present description, the electrolyte layer may be replaced with a solid electrolyte layer, and the electrolytic capacitor may be replaced with a solid electrolytic capacitor. The electrolyte layer may be a stacked body of two or more different electrolyte layers.

The electrolyte layer is disposed so as to cover at least a part of the dielectric layer. The electrolyte layer may be formed using a manganese compound or a conductive polymer. Examples of the conductive polymer include polypyrrole, polythiophene, polyaniline, and a derivative of these. These polymers may be used alone or in combination of a plurality of polymers. Alternatively, the conductive polymer may be a copolymer from two or more kinds of monomers. Note that the derivative of the conductive polymer means a polymer having the conductive polymer as a basic skeleton. For example, examples of the derivative of polythiophene include poly(3,4-ethylenedioxythiophene) and the like.

A dopant may be added to the conductive polymer. The dopant can be selected depending on the conductive polymer, and a known dopant may be used. Examples of the dopant include naphthalenesulfonic acid, p-toluenesulfonic acid, polystyrenesulfonic acid, and salt of these. An example of the electrolyte layer is formed using poly(3,4-ethylenedioxythiophene) (PEDOT) doped with polystyrenesulfonic acid (PSS).

The electrolyte layer containing the conductive polymer may be formed by polymerizing a raw material monomer on the dielectric layer. Alternatively, the dielectric layer may be formed by applying liquid containing the conductive polymer (and a dopant as necessary) to the dielectric layer and then drying the liquid.

(Cathode Layer)

The cathode layer may be a conductive layer formed on the electrolyte layer, for example, may be a conductive layer formed so as to cover the electrolyte layer. The cathode layer may include a carbon layer formed on the electrolyte layer, and a metal paste layer formed on the carbon layer. The carbon layer may be formed by a conductive carbon material such as graphite, and resin. The metal paste layer may be formed of metal particles (for example, silver particles) and resin, and may be formed of, for example, silver paste.

The cathode layer is electrically connected to the cathode lead terminal. The cathode layer may be electrically connected to the cathode lead terminal via a conductive member. The conductive member may be formed of metal particles (for example, silver particles) and resin, and may be formed of, for example, silver paste.

(Outer Packaging Resin)

The outer packaging resin is disposed around the capacitor element so that the capacitor element is not exposed from a surface of the electrolytic capacitor. Furthermore, the outer packaging resin insulates the anode lead terminal from the cathode lead terminal. Known outer packaging resin used for an electrolytic capacitor may be applied to the outer packaging resin. For example, the outer packaging resin may be formed using an insulating resin material used for sealing the capacitor element. Examples of a material of the outer packaging resin include epoxy resin, phenol resin, silicone resin, melamine resin, urea resin, alkyd resin, polyurethane, polyimide, unsaturated polyester, and the like. The outer packaging resin may contain a substance (such as an inorganic filler) other than the resin.

Figure 1:
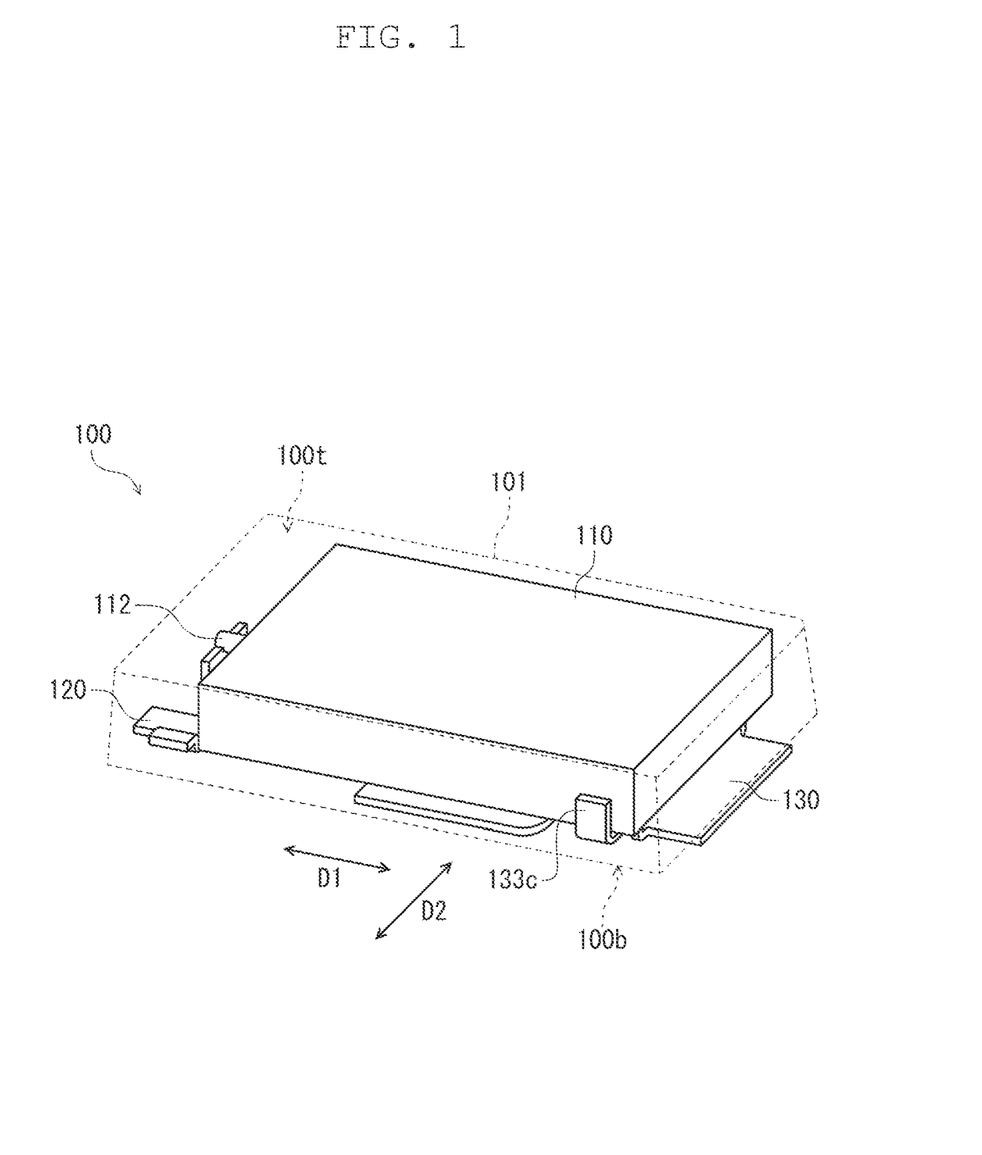
FIG. 1 is a perspective view schematically illustrating a configuration of an example of an electrolytic capacitor of the present disclosure.
Figure 2:
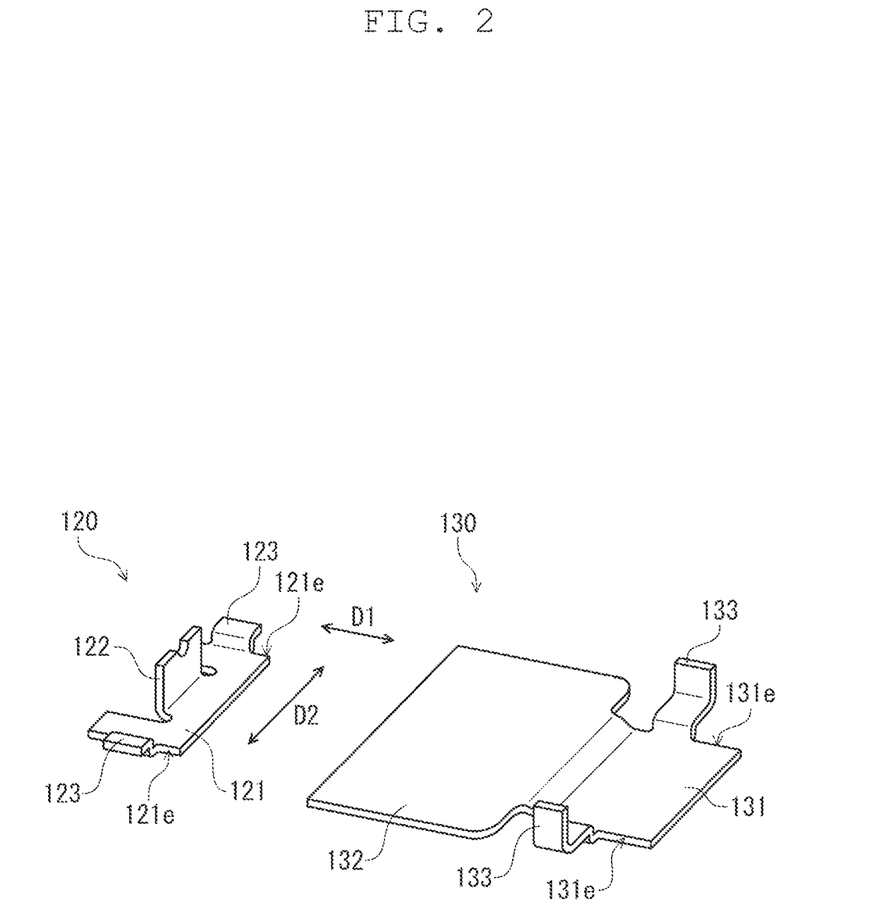
FIG. 2 is a perspective view schematically illustrating a member of a part of the electrolytic capacitor illustrated in FIG. 1.
Figure 3:
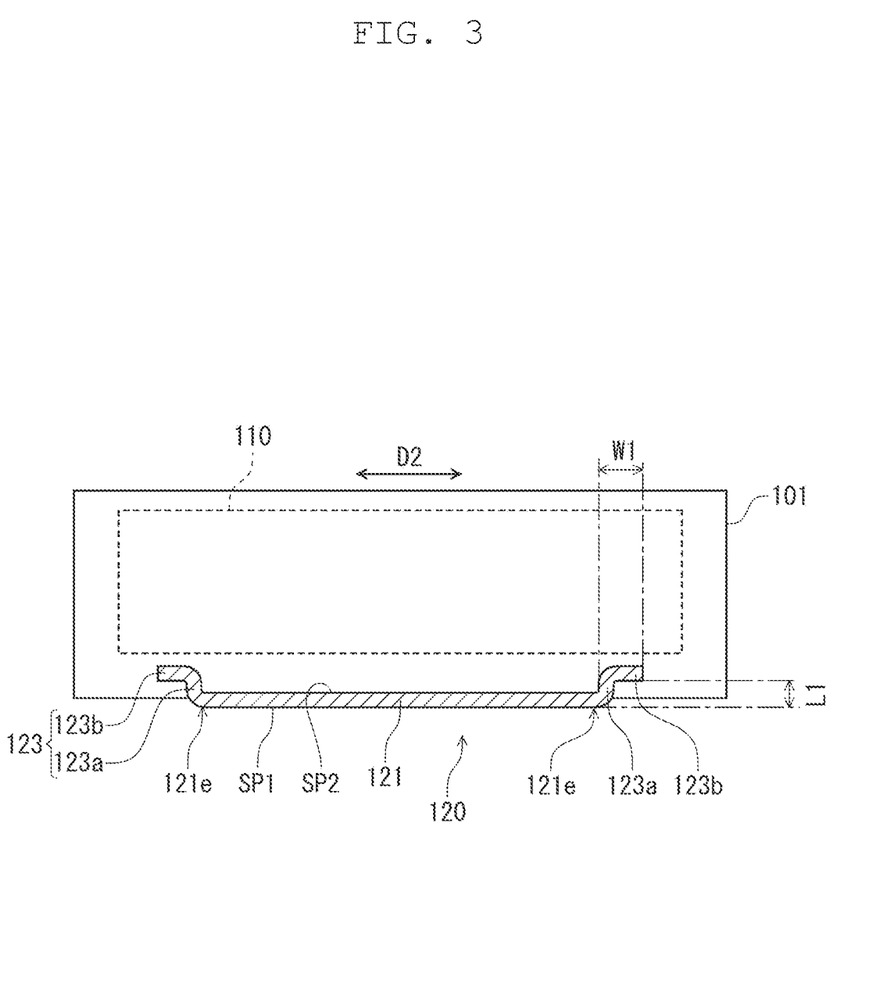
FIG. 3 is a cross-sectional view schematically illustrating an anode lead terminal of the electrolytic capacitor illustrated in FIG. 1.
Figure 4:
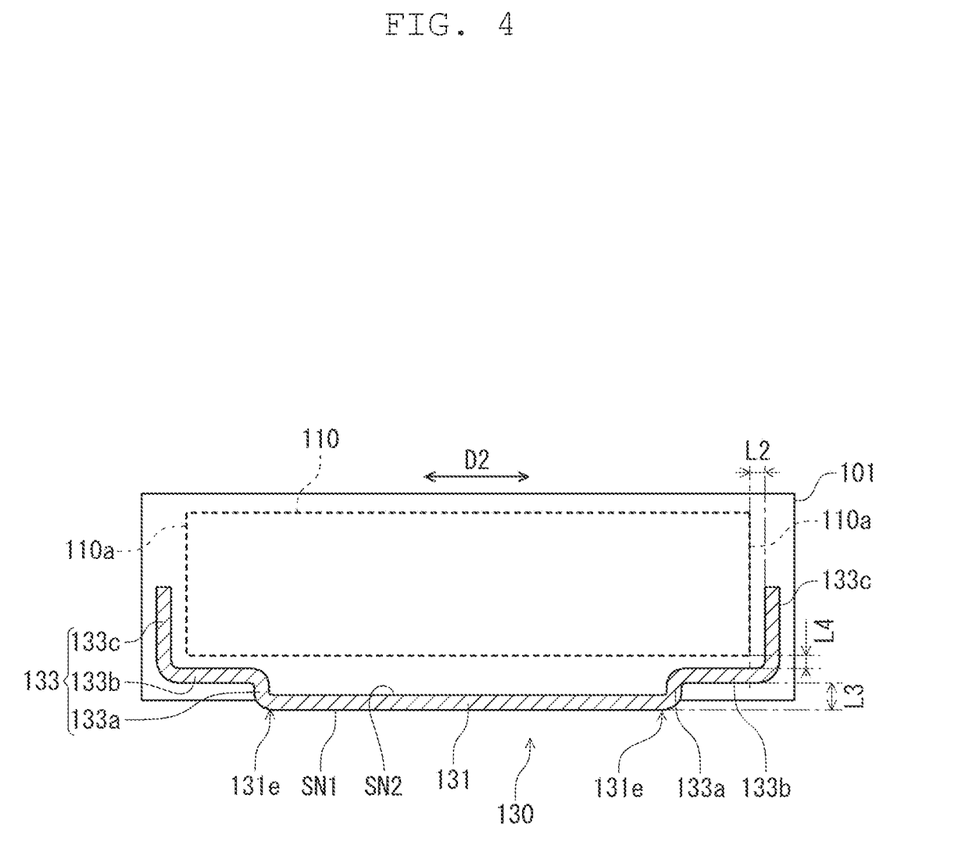
FIG. 4 is a cross-sectional view schematically illustrating a cathode lead terminal of the electrolytic capacitor illustrated in FIG. 1.
Figure 5:
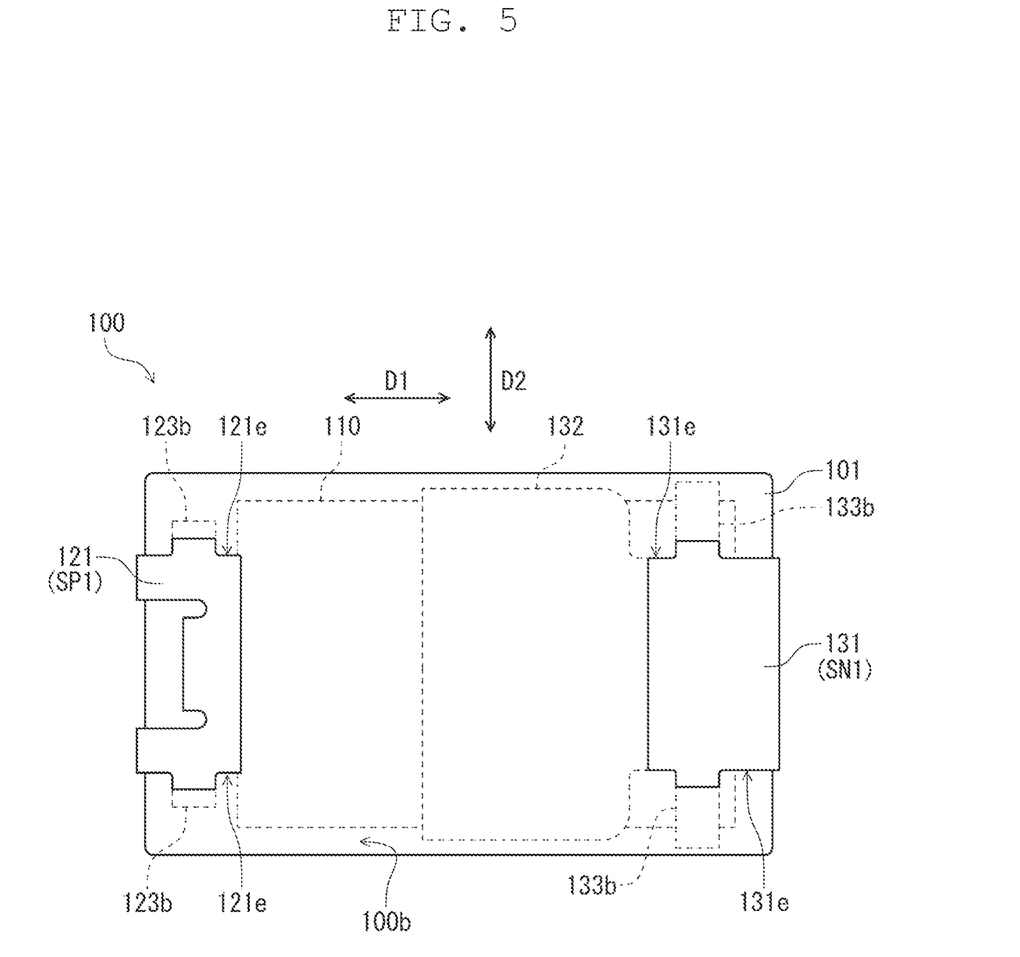
FIG. 5 is a bottom view schematically illustrating the electrolytic capacitor illustrated in FIG. 1.
Figure 6:
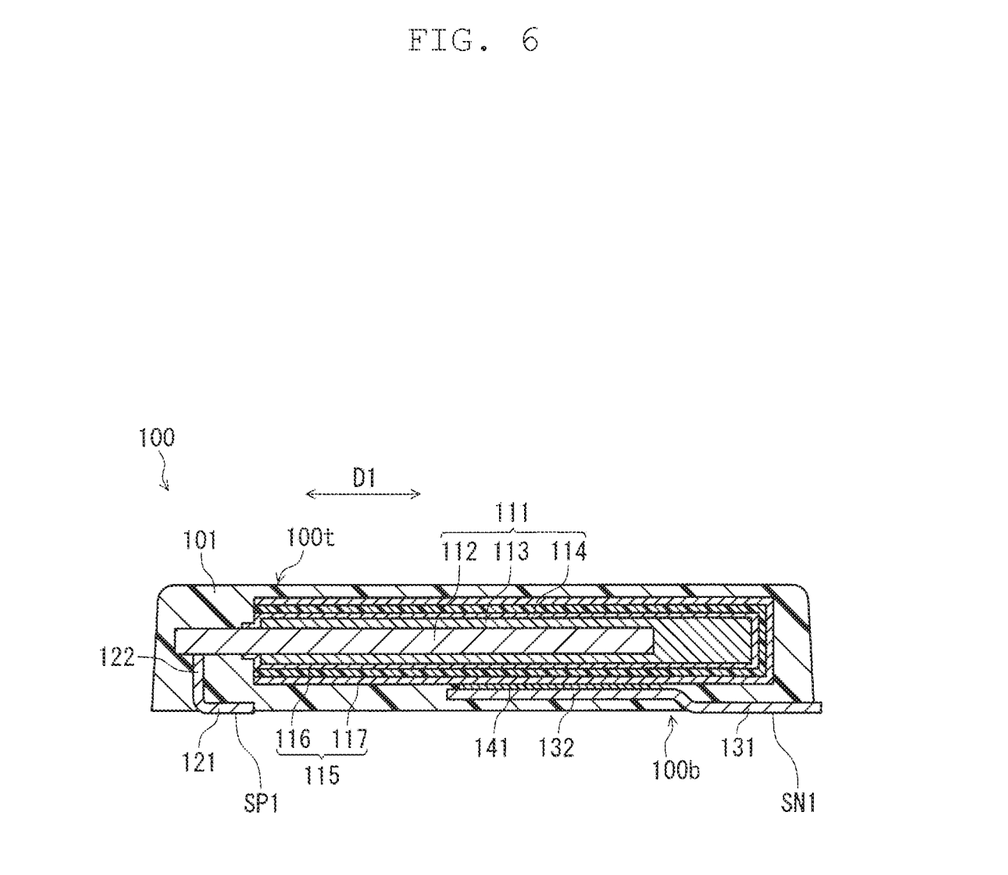
FIG. 6 is a cross-sectional view schematically illustrating the electrolytic capacitor illustrated in FIG. 1.

Hereinafter, an example of the electrolytic capacitor of the present disclosure will be specifically described with reference to the drawings. The above-described constituent elements can be applied to constituent elements of an electrolytic capacitor as an example described below. Further, constituent elements of an electrolytic capacitor as an example described below can be changed based on the above description. Further, a matter described below may be applied to the exemplary embodiment described above. Further, in the exemplary embodiment described below, constituent elements that are not essential to the electrolytic capacitor of the present disclosure may be omitted, FIG. 1 schematically illustrates a perspective view of electrolytic capacitor 100. FIG. 2 schematically illustrates a perspective view of anode lead terminal 120 and cathode lead terminal 130 of electrolytic capacitor 100 illustrated in FIG. 1. FIG. 3 illustrates a cross-sectional view of an anchor portion of anode lead terminal 120. FIG. 4 illustrates a cross-sectional view of an anchor portion of cathode lead terminal 130. Note that, in FIGS. 3 and 4, for easy understanding, a position of capacitor element 110 is indicated by a dotted line, and a contour of outer packaging resin 101 is indicated by a solid line. FIG. 5 schematically illustrates a bottom view of electrolytic capacitor 100 illustrated in FIG. 1. In FIG. 5, a part embedded in outer packaging resin 101 is indicated by a dotted line. Furthermore, FIG. 6 schematically illustrates a cross-sectional view of electrolytic capacitor 100 illustrated in FIG. 1. The cross-sectional view of FIG. 6 is a cross-sectional view passing through a central axis of anode lead (anode wire) 112. Note that, in order to facilitate understanding, some constituent elements may be indicated only by contours in a drawing below. For example, in FIG. 1, outer packaging resin 101 is indicated only by a contour shown by a dotted line.

Electrolytic capacitor 100 includes bottom surface 100$b$, and upper surface 100$t$ opposite to bottom surface 100$b$. Electrolytic capacitor 100 includes capacitor element 110, anode lead terminal 120, cathode lead terminal 130, conductive member 141, and outer packaging resin 101. Anode lead terminal 120 and cathode lead terminal 130 are each electrically connected to capacitor element 110. Anode lead terminal 120 and cathode lead terminal 130 are made from a metal sheet.

Referring to FIGS. 2, 3, and 5, anode lead terminal 120 includes anode terminal 121, wire connection part 122, and two anchor portions 123. A part of anode terminal 121 in a thickness direction is exposed from bottom surface 100b, and anode terminal 121 has first main surface SP1 (exposed surface) exposed from bottom surface 100b. Second main surface SP2 opposite to first main surface PS1 of anode terminal 121 is in contact with outer packaging resin 101.

Wire connection part 122 rises from anode terminal 121 toward upper surface 100t. A groove of wire connection part 122 for receiving a tip of anode lead 112 is formed by resistance welding anode lead 112 and wire connection part 122. Anode lead 112 and wire connection part 122 may be connected by welding, soldering, or the like.

Referring to FIGS. 1 and 2, each of two anode anchor portions 123 extend from a corresponding one of two end sides 121e. Two end sides 121e are end sides of anode terminal 121, and are a pair of end sides each being along direction D1 in which anode lead 112 extends.

Referring to FIGS. 1 and 3, each of two anchor portions 123 includes upright portion 123a that rises from end side 121e toward upper surface 100t, and extension portion 123b that bends to extend from an upper end of upright portion 123a. Two anode anchor portions 123 are bent in different directions at a boundary between anode terminal 121 and upright portion 123a and a boundary between upright portion 123a and extension portion 123b. Specifically, one surface (surface on a side of upper surface 100t) of a metal sheet constituting anode lead terminal 120 is valley folded at the boundary between anode terminal 121 and upright portion 123a, and mountain folded at the boundary between upright portion 123a and extension portion 123b. As a result, extension portion 123b extends from an upper end of upright portion 123a toward the outside of electrolytic capacitor 100. That is, extension portions 123b of two anchor portions 123 are bent from upper ends of upright portions 123a, and extend away from each other with respect to direction (D2) perpendicular to direction (D1) in which anode lead 112 extends. A direction in which extension portion 123b extends is substantially parallel to bottom surface 100b, and for example, an angle formed by both may be in a range from −20° to 20°, inclusive.

With reference to FIGS. 2, 4, and 5, cathode lead terminal 130 includes cathode terminal 131, cathode connection part 132, and two cathode anchor portions 133. A part of cathode terminal 131 in a thickness direction is exposed from bottom surface 100b, and cathode terminal 131 has first main surface SN1 (exposed surface) exposed from bottom surface 100b. Second main surface SN2 opposite to first main surface SN1 of cathode terminal 131 is in contact with outer packaging resin 101.

Referring to FIGS. 2, 5, and 6, cathode connection part 132 is disposed so as to have a step with cathode terminal 131, is located slightly closer to the side of upper surface 100t than cathode terminal 131, and is covered with outer packaging resin 101 on bottom surface 100b. Cathode connection part 132 is disposed along bottom surface 100b from one end side (end side continuous to two end sides 131e to be described later) of cathode terminal 131 along direction (D2) perpendicular to direction (D1) in which anode lead 112 extends.

Cathode connection part 132 is electrically connected to cathode part 115 (cathode layer 117) described later via conductive member 141. That is, cathode terminal 131 is electrically connected to capacitor element 110 via cathode connection part 132 and conductive member 141. Conductive member 141 is not particularly limited, and a known conductive member may be used. For example, conductive member 141 may be formed of metal paste or the like.

Each of two cathode anchor portions 133 extend from a corresponding one of two end sides 131e. Two end sides 131e are end sides of cathode terminal 131, and are a pair of end sides each being along direction D1 in which anode lead 112 extends.

Referring to FIGS. 1 and 4, each of two cathode anchor portions 133 includes an upright portion 133a that rises from the end side 131e toward the upper surface 100t, a first extension portion 133b extending from the upright portion 133a, and a second extension portion 133c extending from the first extension portion 133b.

The first extension portions 133b of two cathode anchor portions 133 are bent from upper ends of the upright portions 133a and extend away from each other. Two cathode anchor portions 133 are bent in different directions at a boundary between cathode terminal 131 and upright portion 133a and a boundary between upright portion 133a and first extension portion 133b. That is, first extension portions 133b of two cathode anchor portions 133 are bent from upper ends of upright portions 133a, and extend away from each other in direction (D2) perpendicular to direction (D1) in which anode lead 112 extends, A direction in which first extension portion 133b extends is substantially parallel to bottom surface 100b, and for example, an angle formed by both may be in a range from −20° to 20°, inclusive.

Referring to FIGS. 1, 2, 4, and 5, second extension portions 133c of two cathode anchor portions 133 each rise toward upper surface 100t, and are provided so as to sandwich capacitor element 110 in direction (D2) perpendicular to direction (D1) in which anode lead 112 extends. Two second extension portions 133c sandwich both side surfaces 110a of capacitor element 110 above cathode terminal 131. A direction in which second extension portion 133c extends is substantially parallel to a direction perpendicular to bottom surface 100b, and for example, an angle formed by both may be in a range from −20° to 20°, inclusive. For example, second extension portion 133c is preferably provided such that its upper end reaches a height corresponding to 10% to 60% of height dimension of capacitor element 110. A width of second extension portion 133c has dimension corresponding to, for example, 5% to 20% of height dimension of capacitor element 110.

Referring to FIG. 3, distance L1 from a surface of anode terminal 121 to a lower surface of extension portion 123b may be more than or equal to 50 μm (for example, more than or equal to 75 μm or more than or equal to 100 μm). By setting distance L1 to more than or equal to 50 μm (for example, more than or equal to 75 μm or more than or equal to 100 μm), a lower part of extension portion 123b can be easily filled with outer packaging resin 101. Note that, in FIG. 3, an upper surface of extension portion 123b is located below a lower surface of capacitor element 110. However, extension portion 123b may be located at a higher position as long as extension portion 123b does not interfere with capacitor element 110.

Referring to FIG. 4, distance L3 from a surface of cathode terminal 131 to a lower surface of first extension portion 133b may be more than or equal to 50 μm (for example, more than or equal to 75 μm or more than or equal to 100 μm), or may be in a range of 50 μm to 500 μm (for example, a range from 75 μm to 200 μm, inclusive). Distance L4 from an upper surface of first extension portion 133b to a lower surface of capacitor element 110 may be more than or equal to 50 μm (for example, more than or equal to 75 μm or more than or equal to 100 μm), or may be in a range from 50 pin to 500 µm, inclusive (for example, a range from 75 µm to 200 µm, inclusive). By setting distance L3 and distance L4 to more than or equal to 50 µm (for example, more than or equal to 75 µm or more than or equal to 100 µm), it becomes easy to fill a lower part and an tipper part of first extension portion 133b with outer packaging resin 101.

Referring to FIG. 4, distance L2 between second extension portion 133c and side surface 110a of the capacitor element may be, for example, more than or equal to 80 µm, and may be in a range from 80 µm to 350 µm, inclusive. When distance L2 falls within the above-mentioned range, position deviation of the capacitor element is easily prevented, and the capacitor element is easily disposed between the two second extension portions. Further, in a case where the second extension portion and the capacitor element are electrically connected via the electrically conductive adhesive layer, the electrically conductive adhesive layer is easily provided.

A horizontal distance W1 (distance along direction D2) from end side 121e to a tip of extension portion 123b may be more than or equal to 50 µm (for example, more than or equal to 75 µm or more than or equal to 100 µm). By setting horizontal distance W1 within this range, a high anchor effect can be obtained. Further, from the viewpoint of shape stability, processability, and the like, horizontal distance W1 may be more than or equal to 200 µm. A horizontal distance from end side 131e of first extension portion 133b to an end on the side of second extension portion 133c may be larger than horizontal distance WI.

Note that a shape of anode lead terminal 120 and cathode lead terminal 130 described above is merely an example, and is not limited to the above shape. For example, anode lead terminal 120 does not need to include the anchor portion. Further, as long as the connection part of cathode lead terminal 130 is electrically connected to cathode part 115 (cathode layer 117), the connection part does not need to be at a position illustrated in the diagram, and does not need to have the shape illustrated in the diagram. Second extension portion 133c may be electrically connected to cathode part 115 (cathode layer 117) described later. Second extension portion 133c may be in contact with side surface 110a of capacitor element 110 via the electrically conductive adhesive layer.

Referring to FIG. 6, capacitor element 110 includes anode part 111 and cathode part 115. Anode part 111 includes anode body 113 having dielectric layer 114 formed on its surface, and anode lead 112. Cathode part 115 includes electrolyte layer 116 disposed so as to cover dielectric layer 114, and cathode layer 117. Cathode layer 117 includes, for example, a carbon layer formed on electrolyte layer 116, and a metal particle layer formed on the carbon layer. The metal particle layer is, for example, a layer formed using metal paste.

As described above, anode part 111 of capacitor element 110 is electrically connected to anode lead terminal 120, and cathode part 115 of capacitor element 110 is electrically connected to cathode lead terminal 130. In a case where electrolytic capacitor 100 is mounted on a substrate or the like of an electronic device, electrolytic capacitor 100 may be mounted by soldering anode terminal 121 and cathode terminal 131 to each other.

An example of a method of manufacturing electrolytic capacitor 100 will be described below. First, capacitor element 110, anode lead terminal 120, and cathode lead terminal 130 are prepared. A method of manufacturing capacitor element 110 is not particularly limited, and the capacitor element can be manufactured by a known method. Anode lead terminal 120 and cathode lead terminal 130 can be formed by a known metal processing method.

Next, anode lead 112 and anode lead terminal 120 are connected, and cathode layer 117 and cathode lead terminal 130 are connected. Anode lead 112 and anode lead terminal 120 can be connected by welding (for example, laser welding) or the like. Cathode layer 117 and cathode lead terminal 130 can be connected by, for example, a method below. First, metal paste to be conductive member 141 is applied to a surface of cathode connection part 132 of cathode lead terminal 130 and/or a surface of cathode layer 117. Next, cathode layer 117 and cathode connection part 132 are bonded to each other with metal paste interposed between them, and the metal paste becomes conductive member 141 by being cured. In this way, cathode layer 117 and cathode lead terminal 130 can be connected to each other. Further, second extension portion 133c and side surface 110a of the capacitor element may be bonded using metal paste.

Next, the capacitor element is sealed with a material (for example, mold resin) of outer packaging resin 101. A sealing step can be performed by a known method. In this way, electrolytic capacitor 100 can be manufactured. Note that other electrolytic capacitors of the present disclosure can also be manufactured by the same manufacturing method.

The present disclosure can be used for an electrolytic capacitor requiring high reliability.

The invention claimed is:

1. An electrolytic capacitor having a bottom surface and an upper surface opposite to the bottom surface, the electrolytic capacitor comprising:
    a capacitor element including an anode lead;
    an anode lead terminal and a cathode lead terminal each electrically connected to the capacitor element; and
    outer packaging resin disposed around the capacitor element, wherein:
    the cathode lead terminal includes a cathode terminal and two cathode anchor portions, the cathode terminal having an exposed surface exposed from the bottom surface, the two cathode anchor portions each extending from the cathode terminal to be embedded in the outer packaging resin,
    the cathode terminal has two end sides each being along a longitudinal direction of the anode lead,
    each of the two cathode anchor portions includes a cathode upright portion, a first extension portion, and a second extension portion, the cathode upright portion rising from a corresponding one of the two end sides of the cathode terminal toward the upper surface, the first extension portion extending from the cathode upright portion, the second extension portion extending from the first extension portion,
    the first extension portion is bent from an upper end of the cathode upright portion,
    the second extension portion rises toward the upper surface,
    the first extension portion of one of the two cathode anchor portions and the first extension portion of another one of the two cathode anchor portions extend away from each other, and
    the second extension portion of the one of the two cathode anchor portions and the second extension portion of the another one of the two cathode anchor portions are provided to sandwich the capacitor element in a direction perpendicular to the longitudinal direction of the anode lead.

2. The electrolytic capacitor according to claim 1, wherein an entire surface of the first extension portion is in contact with the outer packaging resin.

3. The electrolytic capacitor according to claim 1, wherein a region opposite to the exposed surface in a surface of the cathode terminal is in contact with the outer packaging resin.

4. The electrolytic capacitor according to claim 1, wherein:
   the cathode lead terminal further includes a cathode connection part that extends from the cathode terminal, the cathode connection part being embedded in the outer packaging resin,
   the cathode connection part is in contact with a bottom surface of the capacitor element via an electrically conductive adhesive layer, and
   the second extension portion is in contact with a side surface of the capacitor element via an electrically conductive adhesive layer.

5. The electrolytic capacitor according to claim 4, wherein an entire surface of the second extension portion except for a region being in contact with the electrically conductive adhesive layer is in contact with the outer packaging resin.

6. The electrolytic capacitor according to claim 1, wherein:
   the anode lead terminal includes an anode terminal and an anode connection part, the anode terminal having an exposed surface exposed from the bottom surface, the anode connection part extending from the anode terminal to be embedded in the outer packaging resin, and
   the anode connection part is electrically connected to the anode lead.

7. The electrolytic capacitor according to claim 6, wherein:
   the anode connection part rises from the anode terminal toward the upper surface, and
   the anode connection part has a groove for receiving a tip of the anode lead at an upper end of the anode connection part.

8. The electrolytic capacitor according to claim 6, wherein:
   the anode terminal further includes two anode anchor portions each extending from the anode terminal to be embedded in the outer packaging resin,
   the anode terminal has two end sides each being along the longitudinal direction of the anode lead, and
   each of the two anode anchor portions includes an anode upright portion and an anode extension portion, the anode upright portion rising from a corresponding one of the two end sides of the anode terminal toward the upper surface, the anode extension portion bending to extend from an upper end of the anode upright portion.

9. The electrolytic capacitor according to claim 8, wherein an entire surface of the anode extension portion is in contact with the outer packaging resin.

\* \* \* \* \*